UNITED STATES PATENT OFFICE.

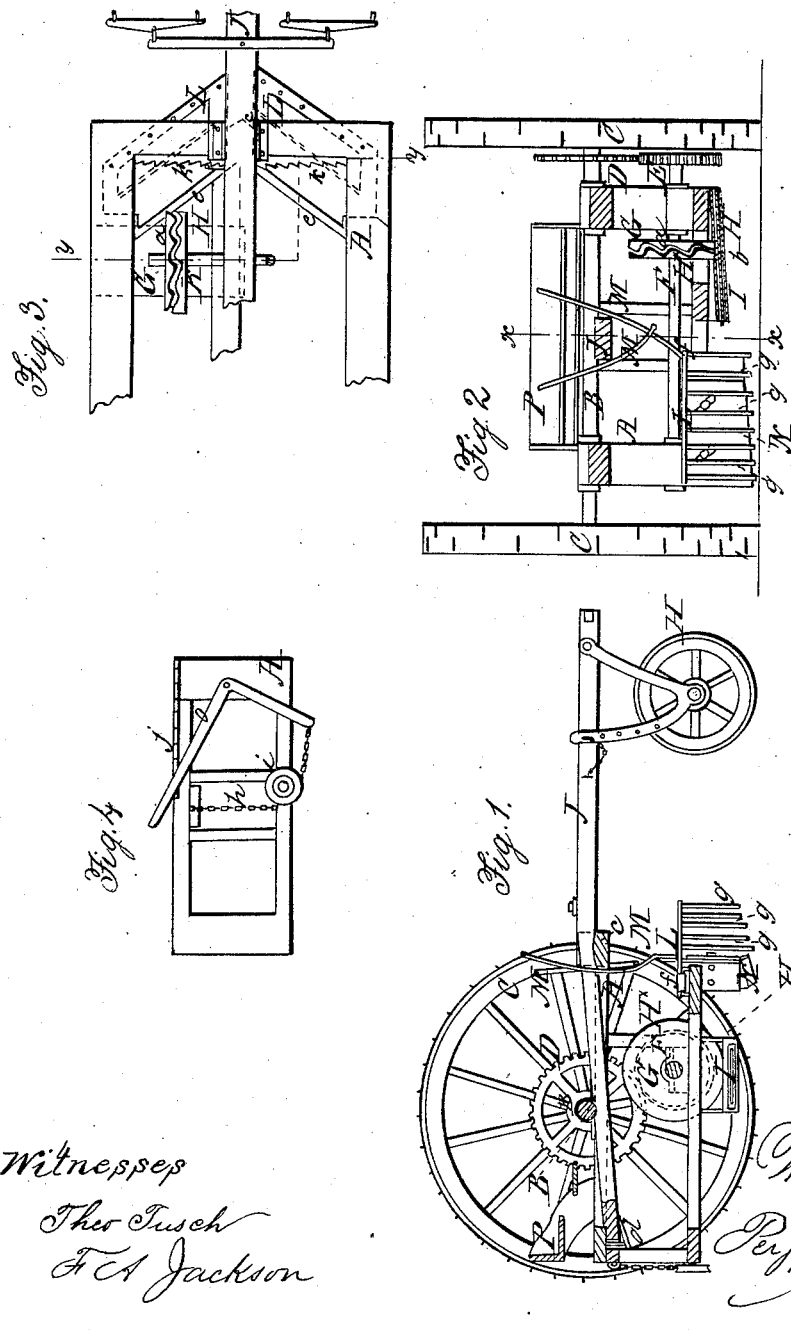

WM. J. ANDREWS, OF COLUMBIA, TENNESSEE.

IMPROVEMENT IN CULTIVATORS.

Specification forming part of Letters Patent No. 57,841, dated September 11, 1866.

*To all whom it may concern:*

Be it known that I, WILLIAM J. ANDREWS, of Columbia, in the county of Maury and State of Tennessee, have invented a new and Improved Cultivator; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line *x x*, Fig. 2; Fig. 2, a transverse vertical section of the same, taken in the line *y y*, Fig. 3; Fig. 3, a plan or top view of a portion of the same; Fig. 4, a rear view of the frame of the same, showing a lever which is connected with the rear end of the draft-pole.

Similar letters of reference indicate like parts.

This invention relates to a new and improved cultivator, designed for scraping, harrowing, and thinning out plants which are grown in elevated or raised drills, such as cotton, &c.

The invention consists in the employment or use of a thinning-hoe, adjustable scrapers, and harrows, all applied to a mounted frame, and arranged to operate in the manner substantially as hereinafter set forth.

A represents a rectangular framing, which is suspended from an axle, B, having a wheel, C, on each end, and a spur-wheel, D, keyed upon it, which gears into a pinion, E, on a shaft, F, the latter being placed in the lower part of the framing A, parallel with the axle, and having a cam, G, upon it, which cam is formed by a zigzag groove, *a*, made in the periphery of a wheel, H*.

To the lower part of the framing A, underneath the cam G, there is secured an inclined case, H, in which a cutter, I, is fitted, and allowed to slide freely, said cutter having a reciprocating motion imparted to it by means of the cam G, a pin, *b*, projecting up from the cutter into the groove *a*. This cutter I, I term a "thinning-hoe," as it works transversely across the rows of plants, cutting them out and leaving a requisite number of plants in the drill at suitable distances apart.

J represents the draft-pole of the machine, which rests on a convex surface, *c*, on the front cross-bar of the framing A, and has a guide-pin, *d*, at the rear end of the framing A, passing through its rear end, as shown in Fig. 1. This draft-pole has a gage-wheel, K, attached to it at a short distance in front of the framing A.

The front part of the lower portion of the framing A is inclined backward at each side of its center, forming two diagonal or oblique surfaces, *e e*, on which metal frames L L rest, said frames being connected at their inner ends to the framing by joints *f*, to admit of each frame L being raised and lowered from its joint *f* as a center. This is done by actuating a lever, M, attached to the frame L, said levers extending up above the framing A.

The upper parts of the frame L project in front of the lower parts, and have harrow-teeth *g* attached, and the lower parts of said frames have scrapers N attached, one to each, the harrow-teeth being a short distance in front of the scrapers, the latter being parallel with the former, and both parallel with the oblique surface, *e*, on which their frame L rests.

The cutter or thinning-hoe I works in line with the space between the inner ends of the scrapers and harrows, and as the machine is drawn along the harrow-teeth *g* pulverize the earth at each side of the ridge or drill, the scrapers N taking out the weeds, and the hoe I thinning out the plants.

The depth of the penetration of the harrows and scrapers may be regulated, as desired, by actuating the rear end of the draft-pole through the medium of a lever, O, which is attached to the rear end of the framing A, and is connected by a chain, *h*, with the draft-pole, said chain passing around a pulley, *i*, on the rear end of the framing, the lever O being retained at any desired point within the scope of its movement by a rack, *j*. The levers M of the frames L L are likewise retained in position by similar racks, *k k*.

P is the driver's seat in the rear part of framing A.

Having thus described my invention, what I claim as new, and desire to secure by Letters Patent, is—

1. The harrows g and scrapers N, attached to adjustable frames L applied to the front part of the framing A, in connection with the reciprocating thinning-hoe I, all arranged and applied to a mounted frame, in the manner substantially as and for the purpose set forth.

2. The gage-wheel K, applied to the draft-pole J, in combination with the lever O, attached to the rear end of the framing, and connected with the rear end of the draft-pole, substantially as and for the purpose specified.

WM. J. ANDREWS.

Witnesses:
W. L. MURPHY,
GEORGE TRISHER.